United States Patent [19]

Ryoke et al.

[11] Patent Number: 4,582,754

[45] Date of Patent: Apr. 15, 1986

[54] MAGNETIC RECORDING MEDIUM

[75] Inventors: Katsumi Ryoke; Shinobu Iida; Masaaki Fujiyama; Eiichi Tadokoro, all of Kanagawa, Japan

[73] Assignee: Fuji Photo Film Co., Ltd., Kanagawa, Japan

[21] Appl. No.: 634,841

[22] Filed: Jul. 26, 1984

[30] Foreign Application Priority Data

Jul. 26, 1983 [JP] Japan .................................. 58-136335

[51] Int. Cl.$^4$ .............................................. G11B 5/70
[52] U.S. Cl. .................................. 428/323; 252/62.54; 360/134; 360/135; 360/136; 428/328; 428/329; 428/522; 428/694; 428/695; 428/900; 427/128
[58] Field of Search .................... 428/695, 694, 425.9, 428/328, 329, 403, 405, 407, 408, 900, 522; 427/132, 131, 128, 323; 252/62.54; 360/134-136

[56] References Cited

U.S. PATENT DOCUMENTS

| | | | |
|---|---|---|---|
| 3,026,215 | 3/1962 | Fukuda | 252/62.56 |
| 3,047,505 | 7/1962 | Miller | 252/62.56 |
| 3,081,264 | 3/1963 | Nobuoka | 252/62.56 |
| 3,423,233 | 1/1969 | Akashi | 428/695 |
| 3,476,596 | 11/1969 | Carroll | 428/695 |
| 3,573,980 | 4/1971 | Haller | 252/62.56 |
| 3,630,772 | 12/1971 | Seidel | 252/62.54 |
| 3,671,435 | 6/1972 | Hwang | 252/62.56 |
| 3,720,618 | 3/1973 | Toda | 252/62.56 |
| 3,770,500 | 11/1973 | Imaoka | 252/62.56 |
| 3,873,462 | 3/1975 | Trandell | 252/62.56 |
| 4,400,435 | 8/1983 | Yoda | 428/425.9 |
| 4,420,532 | 12/1983 | Yamaguchi | 428/694 |
| 4,439,486 | 3/1984 | Yamada | 428/336 |

*Primary Examiner*—Ellis P. Robinson
*Attorney, Agent, or Firm*—Sughrue, Mion, Zinn, Macpeak and Seas

[57] ABSTRACT

A magnetic recording medium comprising a support having provided thereon a magnetic recording layer containing (1) a cobalt-containing iron oxide, (2) graphite, and (3) a copolymer of vinyl chloride, vinyl acetate and maleic acid.

10 Claims, No Drawings

MAGNETIC RECORDING MEDIUM

FIELD OF THE INVENTION

The present invention relates to a magnetic recording medium, and more particularly, it relates to a magnetic recording medium having improved still image life and RF playback output.

BACKGROUND OF THE INVENTION

Generally, the running speed of magnetic recording tapes which run in contact with magnetic heads of magnetic recording and reproducing apparatuses such as audio tape recorders or video tape recorders is high (e.g., 5 m/sec to 40 m/sec). For this reason, if the magnetic recording tapes are insufficiently lubricated, the surface of running magnetic tapes may be easily affected by loading between the magnetic head and tapes, causing serious problems. For example, the magnetic layer of the magnetic recording tapes may separate and wear out, the magnetic head in contact with the tape may wear out, and materials which separate from the magnetic recording medium may stick to the magnetic head.

In recognition of the problem, various attempts have been made to develop solid and liquid lubricating agents, as disclosed in U.S. Pat. Nos. 3,630,772 and 3,642,539. However, known liquid lubricating agents have the disadvantage that they are transferred from the magnetic layer to the opposite surface of the magnetic recording medium and are deteriorated by heat, water or oxygen. Solid lubricating agents have the disadvantages that the lubricating effect decreases when the agent is lost from the surface of the magnetic recording layer, resulting in an increase of dropout and a decrease in RF playback output caused by solid lubricating agent lost from the magnetic recording layer. Therefore, these liquid and solid lubricating agents are usually used in combination to compensate for each others' disadvantages. However, it has been extremely difficult to develop a magnetic recording medium using fine ferromagnetic particles and having high image qualities, in which dropout is prevented, and repeated running characteristics, reproduction of still images and RF playback output are excellent.

SUMMARY OF THE INVENTION

A primary object of the present invention is to provide a magnetic recording medium having excellent running properties.

Another object of the present invention is to provide a magnetic recording medium having an improved RF playback output.

A further object of the present invention is to provide a magnetic recording medium having excellent still images reproduction.

As a result of thorough investigation it has been found that these and other objects of the present invention can be obtained by incorporating graphite and a copolymer of vinyl chloride-vinyl acetate-maleic acid into a magnetic recording layer.

The present invention therefore relates to a magnetic recording medium comprising a non-magnetic support having provided thereon a magnetic recording layer which contains (1) cobalt-containing iron oxide, (2) graphite, and (3) a copolymer of vinyl chloride-vinyl acetate-maleic acid.

DETAILED DESCRIPTION OF THE INVENTION

The thickness of the magnetic recording layer is usually 1 to 15$\mu$.

The cobalt-containing iron oxide which is used in the present invention includes cobalt-containing $\gamma$-Fe$_2$O$_3$, cobalt-containing $\gamma$-Fe$_3$O$_4$ and cobalt-containing iron oxide having a degree of oxidation between those of the above-described iron oxides (i.e., Berthollide compound) as described in U.S. Pat. Nos. 3,026,215, 3,047,505, 3,081,264, 3,573,980, 3,671,435, 3,720,618, 3,770,500 and 3,873,462, German Patent Publication (DAS) No. 1,162,340, *Proceedings of the International Conference* July 1970 Japan p483, *J. Physique* 38 Cl-337 (1977), IEEE *Trans. Magn.* 8, 428 (1972), *Nippon Kogaku Kai Shi* 8 1033–1038 (1979) and *Funtai Oyobi Funmatsu Gokin* 26(4), 149 (1979) and having a specific surface area of about 10 to 50 m$^2$/g, preferably about 20 to 40 m$^2$/g (which is determined by a nitrogen adsorption method).

The cobalt-containing iron oxide which is used in the present invention has a cobalt content of preferably about Co-content of 3 weight% per 100 weight % of iron oxide.

Graphite which is used in the present invention can be in the form of that hexagonal plates, scales, granules, aggregates or clay and have an average particle diameter of about 5$\mu$ or less, preferably about 0.02$\mu$ to 3.0$\mu$ and more preferably about 0.05$\mu$ to 2$\mu$. Further, graphite of the present invention preferably has a fixed carbon content according to JIS-M-8511 of about 92%, ash content of 3.0% or less and a total amount of 1% or less of Si, Al, Fe, Ca, Ti, Mg, etc. as well. The graphite used have a specific surface area of about 100 to 800 m$^2$/g, and preferably about 200 to 700 m$^2$/g, which is determined by a nitrogen adsorption method as described in J. R. Anderson: "Structure of Metallic Catalysts" p.293 Academic Press (1975). The amount of graphite to be used in the present invention is preferably about 0.1 to 20 parts by weight and more preferably about 0.3 to 10 parts by weight per 100 parts by weight of ferromagnetic fine particles.

The polymerization ratio of the vinyl chloride-vinyl acetate-maleic acid copolymer which is used in the present invention is at least 70 mol%, preferably at least 80 mol% vinyl chloride, from 1 to 30 mol%, and preferably from 3 to 20 mol% vinyl acetate; and 0.5 to 10 mol%, preferably 1 to 8 mol% of maleic acid. The ratio of polymerization is not unduly restricted, and can be selected as desired within these ranges.

However, if the copolymer of vinyl chloride-vinyl acetate-maleic acid contains a smaller amount of vinyl chloride than 70 mol%, the copolymer easily separates from the layer to produce fine particles thereof. The copolymer which is used in the present invention has an average degree of copolymerization of 200 to 600, preferably 300 to 500.

In addition to the ferromagnetic oxide, graphite and copolymer claimed, the magnetic recording medium of the present invention may also contain conventional additives, including other binders, lubricants and additives such as organic solvents, abrasives, antistatic agents, and curing agents. Typical binders, lubricants and additives along with a support and methods for preparing magnetic recording media are disclosed in Japanese Patent Publication No. 26890/81, and can be used in the present invention, if desired.

The present invention is further illustrated in greater detail by the following examples, but the present invention is not to be construed as being limited thereto.

In these examples, all parts, ratios and percentages are by weight, unless otherwise indicated.

EXAMPLE 1

The following composition was mixed and kneaded in a ball mill. To the composition was added 35 parts of "Desmodur L-75" (trade name of a polyisocyanate compound which is manufactured by Bayer AG., a 75 wt% ethyl acetate solution of an adduct between 1 mol of trimethylolpropane and 3 mols of tolylenediisocyanate) and the resulting mixture was mixed and kneaded to prepare a uniform magnetic coating composition.

| | |
|---|---|
| Co-containing $\gamma$-$Fe_2O_3$ particle (Co-content of 3 weight % per 100 weight % of $Fe_2O_3$; specific surface area: 25 m$^2$/g) | 300 parts |
| Copolymer of vinyl chloride-vinyl acetate-maleic acid (85:10:5) (average polymerization degree: 500) | 30 parts |
| Epoxy resin (viscosity: 900–1,300 cps at 25° C.; Density: 1.17; Epoxy group content: 0.56) | 30 parts |
| Graphite (specific surface area: 200 m$^2$/g) | 10 parts |
| Oleic acid | 5 parts |
| Ethyl acetate | 500 parts |
| Cyclohexane | 300 parts |

The resulting magnetic coating composition was uniformly coated on a 15$\mu$ polyester support and was dried to prepare a magnetic recording tape having a magnetic layer 5$\mu$ thick.

The resulting magnetic tape was subjected to calendering treatment and was cut to a width of 1 inch to prepare Sample No. 1.

COMPARATIVE EXAMPLE 1

The same procedure as described in Example 1 was repeated to prepare Sample No. 2 except that graphite was removed from the composition as described in Example 1.

COMPARATIVE EXAMPLE 2

The same procedure as described in Example 1 was repeated to prepare Sample No. 3, except that the 30 parts of vinyl chloride-vinyl acetate-maleic acid copolymer were replaced by 30 parts of nitrocellulose (average degree of polymerization: 80, number average molecular weight: about 40,000; degree of nitration: 10.7 to 11.5%).

Still life, running tension in recording and reproducing apparatuses and RF playback output were measured for Sample Nos. 1 to 3 as described below, as shown in Table 1.

TABLE 1

| Sample No. | Binder | Graphite | Still Life | Running Tension | RF Playback Output |
|---|---|---|---|---|---|
| 1 | Vinyl chloride-vinyl acetate-maleic acid copolymer | added | >90 min. >90 min. | 280 g | +1.5 dB |
| 2 | Vinyl chloride-vinyl acetate-maleic acid copolymer | omitted | 30 min. 31 min. | 330 g | +1.8 dB |
| 3 | Nitrocellulose | added | >90 min. >90 min. | 300 g | 0 dB (standard) |

The evaluations shown in Table 1 were carried out in the following manner.

Still life was evaluated by recording image signals on sample tapes using a video tape recorder, reproducing the recorded signals in a still (stop) mode and twice measuring the period of time that the RF playback output level is reduced to the half of the original level. Running tension was evaluated by fixing a tension meter on the tape path of a video tape recorder, and measuring the running tension of tape samples after the tape samples had run repeatedly for 500 passes. The RF playback output was evaluated by recording image signals on sample tapes using a standard recording image signal level which were mounted on a video tape recorder and measuring the RF playback output of sample tapes after these tapes had run repeatedly for 500 passes. The data show the relative values when Sample tape No. 3 is assigned the value 0 dB.

It is apparent from Example 1 that running properties were markedly improved (i.e., running tension was significantly reduced) adding graphite into a magnetic recording layer and that decrease of the RF playback output which is caused by the addition of graphite is compensated by the combination use of a copolymer of vinyl chloride-vinyl acetate-maleic acid and graphite, whereby an excellent magnetic recording medium can be obtained.

EXAMPLE 2

The following composition was mixed and kneaded in a ball mill as in Example 1, and 40 parts of "Desmodur L-75" were added thereto and mixed and dispersed to prepare a uniform magnetic coating composition as in Example 1.

| | |
|---|---|
| Co-containing $\gamma$-$Fe_2O_3$ particle (Co-content of 10 weight % per 100 weight % of $Fe_2O_3$; specific surface area: 30 m$^2$/g) | 300 parts |
| Copolymer of vinyl chloride-vinyl acetate-maleic acid (mol ratio: 85:10:5) (average polymerization degree: 500) | 30 parts |
| Epoxy resin (Viscosity: 900–1,300 cps at 25° C.; Density: 1.17; Epoxy group content: 0.56) | 25 parts |
| Carbon black (Average particle size: 23 $\mu$m) | 30 parts |
| Nitrocellulose (average degree of polymerization: 80; Number average molecular weight: about 40,000; Degree of nitration: 10.7 to 11.5%) | 10 parts |
| Lecithin | 5 parts |
| Butyl laurate | 5 parts |
| Graphite (specific surface area 500 m$^2$/g) | x parts |
| Ethyl acetate | 400 parts |
| Cyclohexanone | 200 parts |

The resulting magnetic coating composition was uniformly coated on a 15$\mu$ polyester support and dried to prepare a magnetic recording tape having a magnetic layer 5$\mu$ thick. The magnetic recording tape was subjected to calendering treatment in the same manner as in Example 1 and was cut to a width of 1 inch to prepare a sample tape.

Still life was measured for the following Samples 4-8 thus prepared, as shown in Table 2.

TABLE 2

| Sample No. | Graphite × parts | Still Images (min.) | | RF Playback Output |
|---|---|---|---|---|
| 4 | 0 | 24 | 23 | 0 dB (standard) |
| 5 | .1 | 59 | 63 | 0 dB |
| 6 | 10 | >90 | 81 | −0.3 dB |
| 7 | 30 | >90 | >90 | −0.6 dB |
| 8 | 60 | >90 | >90 | −1.2 dB |

The evaluation with respect to still life and RF playback output was conducted in the same manner as described in Example 1.

It is apparent from this Example that still life is significantly improved when the amount of graphite added is 0.3 part or more per 100 parts of ferromagnetic particles. Since the addition of graphite results in decreased RF playback output, the upper limit of the amount of graphite to be added depends upon the acceptable range of video output, and it is preferred that the amount of graphite to be added is 20 parts or less per 100 parts of ferromagnetic particles.

EXAMPLE 3

The following composition was mixed and kneaded in a ball mill as in Example 1, and 20 parts of "Desmodur L-75" were added thereto and mixed and dispersed to prepare a uniform magnetic coating composition as in Example 1.

| | |
|---|---|
| Co-Containing γ-Fe$_2$O$_3$ particle (Co-content of 10 weight % per 100 weight % of Fe$_2$O$_3$; specific surface area: 30 m$^2$/g) | 300 parts |
| Copolymer of vinyl chloride-vinyl acetate-maleic acid (mol ratio: 85:10:5) (Average polymerization degree: 400) | 40 parts |
| Polyurethane (Estene 5701 manufactured by B. F. Goodrich Co.) | 20 parts |
| Carbon Black (Average particle size: 50 mμ) | 10 parts |
| Lecithin | 1 part |
| Butyl laurate | 3 parts |
| Myristic Acid | 1 part |
| Abrasive (α-Al$_2$O$_3$) | 10 parts |
| Oleic Acid | 1 part |
| Graphite (specific surface area: 200 m$^2$/g) | 3 parts |
| Butyl acetate | 400 parts |
| Cyclohexanone | 200 parts |

The resulting magnetic coating composition was uniformly coated on a 15μ polyester support and dried to prepare a magnetic recording tape having a magnetic layer 5μ thick. The magnetic recording tape obtained was subjected to calendering treatment in the same manner as in Example 1 and was cut to a width of 1 inch to prepare a sample tape (Sample No.9).

COMPARATIVE EXAMPLE 3

The same procedure as described in Example 3 was repeated to prepare Sample No.10 except that graphite (3 parts) was removed from the composition as described in Example 3.

COMPARATIVE EXAMPLE 4

The same procedure as described in Example 3 was repeated to prepare Sample No.11 except that the abrasive (10 parts) was removed from the composition as described in Example 3.

COMPARATIVE EXAMPLE 5

The same procedure as described in Example 3 was repeated to prepare Sample No.12 except that graphite (3 parts) and the abrasive (10 parts) were removed from the composition as described in Example 3.

Still life and RF playback output were measured in the same manner as in Example 1. Also, RF playback output after 1,000 passes was measured in the same manner as in Example 1 except that number of passes was increased to 1,000 in order to determine running durability. The results obtained are shown in Table 3 in which the data show the relative values when Sample tape No.9 is assigned the value 0 dB.

TABLE 3

| Sample No. | Amount of Graphite (parts) | Amount of Abrasive (parts) | Still Life (min.) | | RF Playback Output (dB) | RF Playback Output After 1,000 Passes (dB) |
|---|---|---|---|---|---|---|
| 9 | 3 | 10 | >90, | >90 | 0 (standard) | 0 (standard) |
| 10 | — | 10 | 72, | 24 | 0 | −0.7 |
| 11 | 3 | — | 85, | 83 | 0 | −0.4 |
| 12 | — | — | 18, | 15, | −1.7 | <−3.0 |

It is apparent from Example 3 and Comparative Examples 3 to 5 that although conventional abrasive is somewhat effective for maintaining running durability a composition comprising graphite, a vinyl chloride-vinyl acetate-maleic acid copolymer and Co-containing γ-Fe$_2$O$_3$ is superior thereto.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having provided thereon a magnetic recording layer containing (1) a cobalt-containing iron oxide, (2) 0.1 to 20 parts by weight per 100 parts by weight of the cobalt-containing iron oxide of graphite having a specific surface area of about 100 to 800 m$^2$/g, and (3) a copolymer comprising at least about 70 mol% of vinyl chloride, 1 to 30 mol% of vinyl acetate and about 0.5 to 10 mol% maleic acid.

2. The magnetic recording medium as claimed in claim 1, wherein the cobalt-containing iron oxide is cobalt-containing γ-Fe$_2$O$_3$, cobalt-containing γ-Fe$_3$O$_4$ or a cobalt-containing iron oxide having a degree of oxidation between γ-Fe$_2$O$_3$ and γ-Fe$_3$O$_4$.

3. The magnetic recording medium as claimed in claim 1, wherein the cobalt containing iron oxide has a specific surface area of from about 10 to 50 m$^2$/g.

4. The magnetic recording medium as claimed in claim 1, wherein cobalt containing iron oxide has a specific surface area of from 20 to 40 m$^2$/g.

5. The magnetic recording medium as claimed in claim 1, wherein the amount of cobalt-containing iron oxide is 0.5 to 10 weight% per 100 weight% of iron oxide.

6. The magnetic recording medium as claimed in claim 1, wherein the average particle size of the graphite is not more than about 5 microns ($\mu$m).

7. The magnetic recording medium as claimed in claim 1, wherein the graphite has at least about 92% fixed carbon and not more than about 3% of ash content.

8. The magnetic recording medium as claimed in claim 1 wherein the average polymerization degree of the copolymer is about 200 to 600.

9. The magnetic recording medium as claimed in claim 1, wherein said magnetic recording layer contains an abrasive.

10. The magnetic recording medium as claimed in claim 9 wherein said abrasive is $\alpha$-$Al_2O_3$.

* * * * *